United States Patent [19]
Otsuka

[11] Patent Number: 5,519,710
[45] Date of Patent: May 21, 1996

[54] NETWORK SYNCHRONIZATION FOR TDMA CELLULAR COMMUNICATION USING SIGNALS FROM MOBILE STATIONS IN NEIGHBORING CELLS

[75] Inventor: Shigeru Otsuka, Tokyo, Japan

[73] Assignee: NEC Corporation, Japan

[21] Appl. No.: 249,319

[22] Filed: May 26, 1994

[30] Foreign Application Priority Data

May 26, 1993 [JP] Japan ..................................... 5-145417
Nov. 29, 1993 [JP] Japan ..................................... 5-297963

[51] Int. Cl.$^6$ ..................................................... H04J 3/16
[52] U.S. Cl. ........................ 370/95.3; 370/108; 370/107; 379/63; 455/54.1
[58] Field of Search ................................. 370/95.3, 108, 370/93, 58.1, 18, 94.1; 375/107; 379/58, 59, 60, 63; 455/33.1, 33.2, 49.1, 54.1, 67.3, 67.6; 371/42

[56] References Cited

U.S. PATENT DOCUMENTS

| | | | |
|---|---|---|---|
| 4,317,195 | 2/1982 | Barberis et al. | 370/94.1 |
| 5,103,459 | 4/1992 | Gilhousen et al. | 370/18 |
| 5,293,380 | 3/1994 | Kondo | 370/95.3 |
| 5,323,446 | 6/1994 | Kojima et al. | 370/95.3 |
| 5,355,515 | 10/1994 | Sicher | 379/60 |
| 5,363,373 | 11/1994 | Nakahara et al. | 370/95.3 |

FOREIGN PATENT DOCUMENTS

0131662  7/1983  European Pat. Off. ........... H04J 3/06

*Primary Examiner*—Douglas W. Olms
*Assistant Examiner*—Shick Hom
*Attorney, Agent, or Firm*—Ostrolenk, Faber, Gerb & Soffen

[57] ABSTRACT

In a TDMA cellular communication network, one of the cell sites is a reference station for establishing a time reference in response to a timing signal from a mobile switching office, and each of the other cell sites is a subordinate station. Each subordinate station establishes a time slot in response to the timing signal from the mobile switching system and receives a signal from a mobile station located in the area of the reference station for detecting a time lapse between the time slot and the signal from the mobile station. A delay time is introduced to the time slot according to the time lapse so that the time slot is synchronized to the time reference of the reference station. In a second embodiment, each subordinate station transmits a signal indicative of the detected time lapse to the mobile switching system, where a delay time value is derived from those signals received from a chain of subordinate stations and returned to each subordinate station for performing the time slot adjustment. The delay time value is a modulo τ summation of the time lapses received from such chain of subordinate stations, where τ is the duration of the time slot.

14 Claims, 7 Drawing Sheets

5,519,710

NETWORK SYNCHRONIZATION FOR TDMA CELLULAR COMMUNICATION USING SIGNALS FROM MOBILE STATIONS IN NEIGHBORING CELLS

BACKGROUND OF THE INVENTION

Field of the Invention

The present invention relates generally to network synchronization, and more specifically to synchronization for a TDMA (time division multiple access) cellular communication network.

Description of the Related Art

According to a known synchronization technique for a digital cellular communication network, a reference cell site broadcasts a reference timing signal at periodic intervals over radio propagation paths using a dedicated transmitter or via respective land-lines. A plurality of subordinate cell sites are provided with a dedicated receiver for receiving the timing signal to adjust their slot timing. However, it is impossible to provide precision timing adjustment due to the inherent differences in length of the propagation paths and the land-lines.

SUMMARY OF THE INVENTION

It is therefore an object of the present invention to provide a network synchronization technique which no longer suffers from the prior art disadvantages.

According to a first aspect, the present invention provides a TDMA cellular communication network comprising a mobile switching system, and a plurality of cell site stations connected via respective paths to the mobile switching system for receiving a reference timing signal therefrom. One of the cell site stations is a reference station for establishing a time reference in response to the received reference timing signal, and each of the remainder cell site stations is a subordinate station. Each of the subordinate stations establishes a time slot in response to the reference timing signal from the mobile switching system and receives a signal from a mobile station which is located in the coverage area of the reference station and in communication with the reference station. The subordinate station detects a time lapse between the time slot and the signal from the mobile station, and introduces a delay time into the time slot according to the time lapse so that the delayed time slot is synchronized to the time reference of the reference station. This is particularly suitable and advantageous for a cluster of cell sites in which the reference station is at the center of the cluster bordering on each of the subordinate stations.

In a preferred embodiment, each subordinate station stores a plurality of values of the time lapse in a memory and derives an average value of time lapses from the stored values to introduce the average value of time lapses to the time slot.

According to a second aspect, each subordinate station transmits a signal indicative of the detected time lapse to the mobile switching system, where a delay time value is derived from the time lapse indicative signals which are received from a chain of the subordinate stations and transmitted to each subordinate station. On receiving the delay time value, each subordinate station introduces a delay time into the time slot so that it is synchronized to the time reference of the reference station. This is particularly suitable for a cluster of cell sites in which some of the cell sites are bordering on other subordinate stations of the same cluster.

BRIEF DESCRIPTION OF THE DRAWINGS

The present invention will be described in further detail with reference to the accompanying drawings, in which.

DETAILED DESCRIPTION

Figure 1:
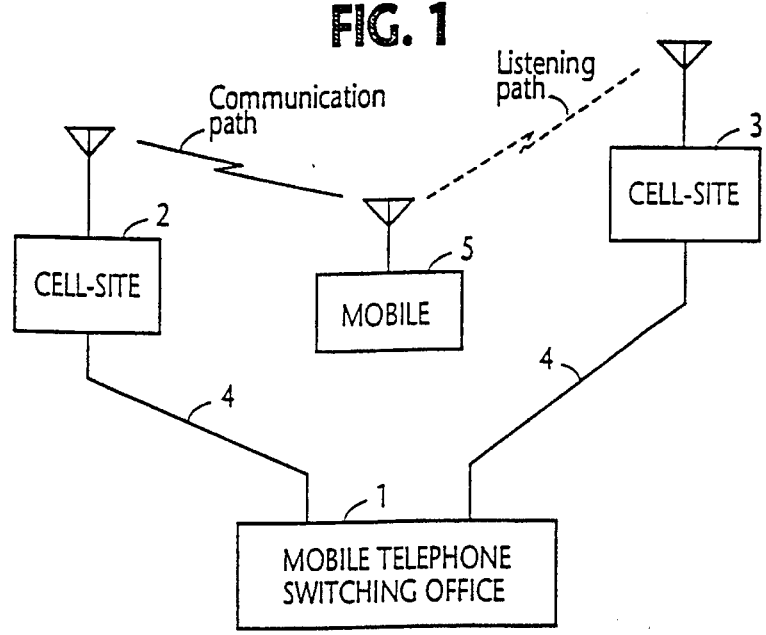
FIG. 1 is a schematic block diagram of an exemplary cellular communication network in which the present invention is embodied.

An exemplary digital cellular communication network in which the present invention is embodied is illustrated in FIG. 1. The system in FIG. 1 utilizes IDMA modulation techniques in communication between mobile units and cell-site stations. In FIG. 1, a mobile telephone switching office 1, connected to the public switched telephone network, not shown, typically includes interface and processing circuitry for providing system control to cell site stations 2 and 3 via coaxial cables 4 and providing routing control of telephone calls from the PSTN to the appropriate cell site station for transmission to the appropriate mobile unit and routing of calls from the mobile units via a cell site station to the PSTN. The MTSO may direct calls between mobile users via the appropriate cell site stations.

According to a first embodiment of the present invention, the cell site 2 operates as a reference station for establishing the reference slot timing for the network and the cell site 3 operates as a subordinate station for establishing its own slot timing based on the reference timing established by the cell site 2.

Figure 2:
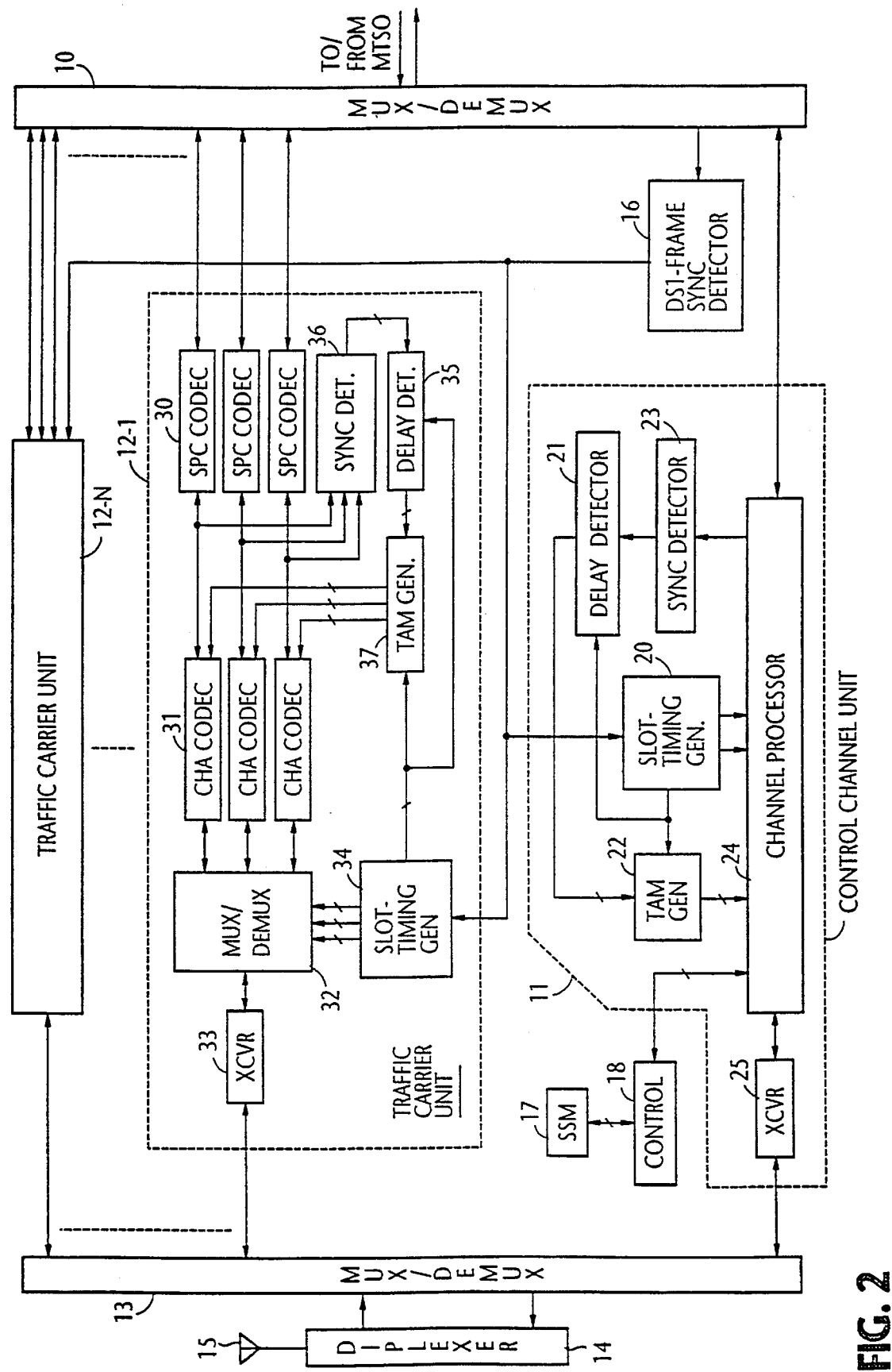
FIG. 2 is a block diagram of a cell site which operates as a reference station.

As shown in FIG. 2, the cell site station 2 has, on the network side, a multiplexer/demultiplexer unit (MUX/DEMUX) 10 to transmit and receive digital signals of DS1 level (1.5 Mbps primary rate signal) to and from the MTSO via the coaxial cable 4 and a MUX/DEMUX unit 13, on the mobile side, to transmit and receive TDMA frames (42 kbps) of three time slots each to and from mobile units via diplexer 14 and antenna 15. A control channel unit 11 and a plurality of traffic carrier units 12-1 through 12-N are connected between the MUX/DEMUX units 10 and 13.

MUX/DEMUX unit 10 decomposes the 1.5 Mbps DS1 signal into 24 channels of 64 kbps each. A DS1-frame sync detector 16 is connected to one of the outputs of MUX/DEMUX unit 10 to produce an output pulse in response to a frame sync that appears once for each DS1 frame comprising the 24 time slots. A controller 18 is connected to a serving cell-site slot memory 17 which stores busy/idle status of all traffic (speech) channels, or time slots of the cell site 2.

Control channel unit 11 comprises a slot timing generator 20 which is responsive to the output of the frame sync detector 16 to produce timing pulses for transmit and receive control channels. These timing pulses are applied to a channel processor 24 and the transmit timing signal is also applied to a delay detector 21 and a timing advance message generator 22. A sync detector 23 is connected to the channel processor 24 to monitor a sync word contained in an uplink burst transmitted from a mobile unit and supplies an output signal to the delay detector 21 when the sync word is detected. Delay time detector 21 is activated by the transmit timing pulse from slot timing generator 20 to measure the length of time elapsed from the transmission of a downlink burst to a mobile unit to the arrival time of an uplink burst from the mobile unit so that the round trip time between the cell site and the mobile is determined. The output of the delay time detector 21 is applied to the timing advance message generator 22.

For compensating for the varying distances between the cell site and mobile units, the timing advance message generator 22 translates the output of delay time detector 21 into a timing advance message which indicates the timing at which the mobile unit is to send an uplink burst. This timing advance message is supplied to the channel processor where it is multiplexed with each downlink burst to advance the timing of each mobile unit so that the data bursts transmitted by the mobile unit may fall exactly into the time slot structure at the cell site receiver. The channel processor 24 is connected at one end to appropriate terminals of the MUX/DEMUX unit 10 to exchange control signals with the MTSO 1 and connected at the other end to a radio transceiver 25 to communicate with a mobile unit initiating or receiving a call.

Each traffic carrier unit 12 includes a set of three speech coder/decoders, or codecs 30 connected to corresponding terminals of the MUX/DEMUX unit 10 and a set of corresponding channel codecs 31. Each speech codec 30 translates the 64-Mbps digital incoming signal to a 11.2 kbps signal using data compression techniques such as a codebook-excited linear prediction speech coding algorithm. The 11.2-kbps output of each speech codec is applied to the corresponding channel codec 31 where forward error correction bits are inserted. Each traffic carrier unit further includes a slot-timing generator 34, a timing advance message generator 37 and a delay time detector 35. Slot-timing generator 34 is connected to the output of frame sync detector 16 to supply the transmit and receive slot timing signals to a MUX/DEMUX unit 32. In order to amend the timing advance of each mobile unit during operation, the timing advance message generator 37 responds to an output of the delay time detector 35 for applying a renewed timing advance message to each channel codec. Delay time detector 35 determines the round trip time for each channel codec from the time difference between the output of frame sync detector 16 and a sync word which is detected by a sync word detector 36 in the data signal received by each channel codec 31. The timing advance message data and other control bits are added in each channel codec to the 11.2 kbps output of each speech codec 30 to produce a 14 kbps signal which is multiplexed by the MUX/DEMUX unit 32 with the outputs of the other speech codecs to produce a 42 kbps output data stream. This data stream is modulated by a radio transceiver 33 upon the carrier of the particular frequency of the unit 12 and transmitted as a downlink TDMA frame to mobile units. An uplink data burst from a mobile unit is demultiplexed and demodulated by the transceiver 33 and fed into the appropriate channel codec 31 where the signal is converted to 11.2 kbps signal and applied to the corresponding speech codec where it is converted to a 64 kbps signal.

When a mobile unit 5 is located in the coverage area of cell site 2 and initiates a call, it sends a call request containing a sync word and a destination user address on the specified time slot to the cell site 2 where it is received by the channel processor 24 and relayed to the MTSO to allow it to establish a connection to a destination system user. The timing advance message generator 22 generates a timing advance message for the requesting mobile user. On the other hand, the channel processor 24 instructs the controller 18 to search the serving cell-site slot memory 17 for an idle speech channel and returns a control signal to the mobile unit, containing the identification of the idle speech channel and the timing advance message, to cause it to switch to the assigned speech channel. During communication, the distance between mobile unit 5 and cell site 2 may vary and hence the round trip delay varies accordingly. To compensate for the varying distance at intervals, the timing advance message generator 37 of the traffic carrier unit that is assigned to the mobile unit 5 to update its timing advance. Using the timing advance message, the mobile unit transmits an uplink burst containing a sync word during communication.

Figure 3:
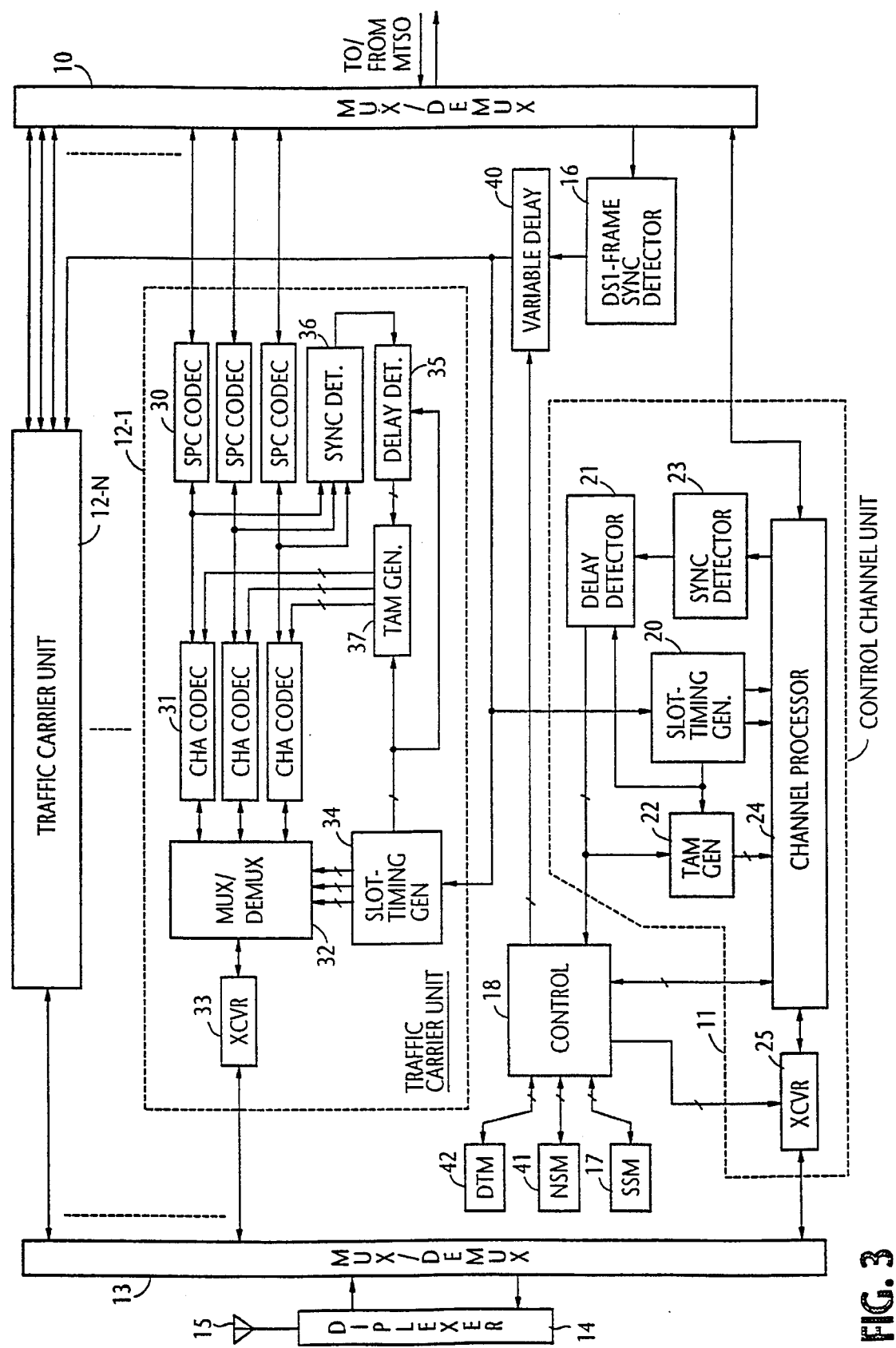
FIG. 3 is a block diagram of a cell site which operates as a subordinate station.

FIG. 3 illustrates the details of cell site station 3. Cell site station 3 differs from cell site 2 by the inclusion of a variable delay circuit 40, a neighboring cell-site slot memory 41 and a delay time memory 42. Variable delay circuit 10 is connected to the output of DS1-frame sync detector 16 to introduce an amount of delay determined by an output signal from the controller 18 into the reference timing signal supplied to all the slot timing generators 20 and 34.

Controller 18 is associated with the neighboring cell-site slot memory 41 and delay time memory 42 as well as with the serving cell-site slot memory 17. At intervals, controller 18 searches the speech channels of a neighboring cell site, i.e., cell site 2 to retune the transceiver 25 to listen to mobile units located in cell site 2 for adjusting the reference slot timing of the cell site 3 with respect to the reference timing of cell site 2. This is accomplished as follows. Variable delay circuit 40 is initially adjusted to zero setting and slot timing generator 20 at cell site 3 is triggered in response to each output of frame sync detector 16 to provide a timing signal at slot intervals to delay detector 21. Transceiver 25 is returned to receive an uplink burst from a mobile unit in a neighboring cell to allow sync detector 23 to detect a sync word contained in the received uplink burst. The delay time detector 21 produces an output indicating the time difference between the most recent slot timing and the reception of the uplink burst from the neighboring cell site mobile.

Figure 4:
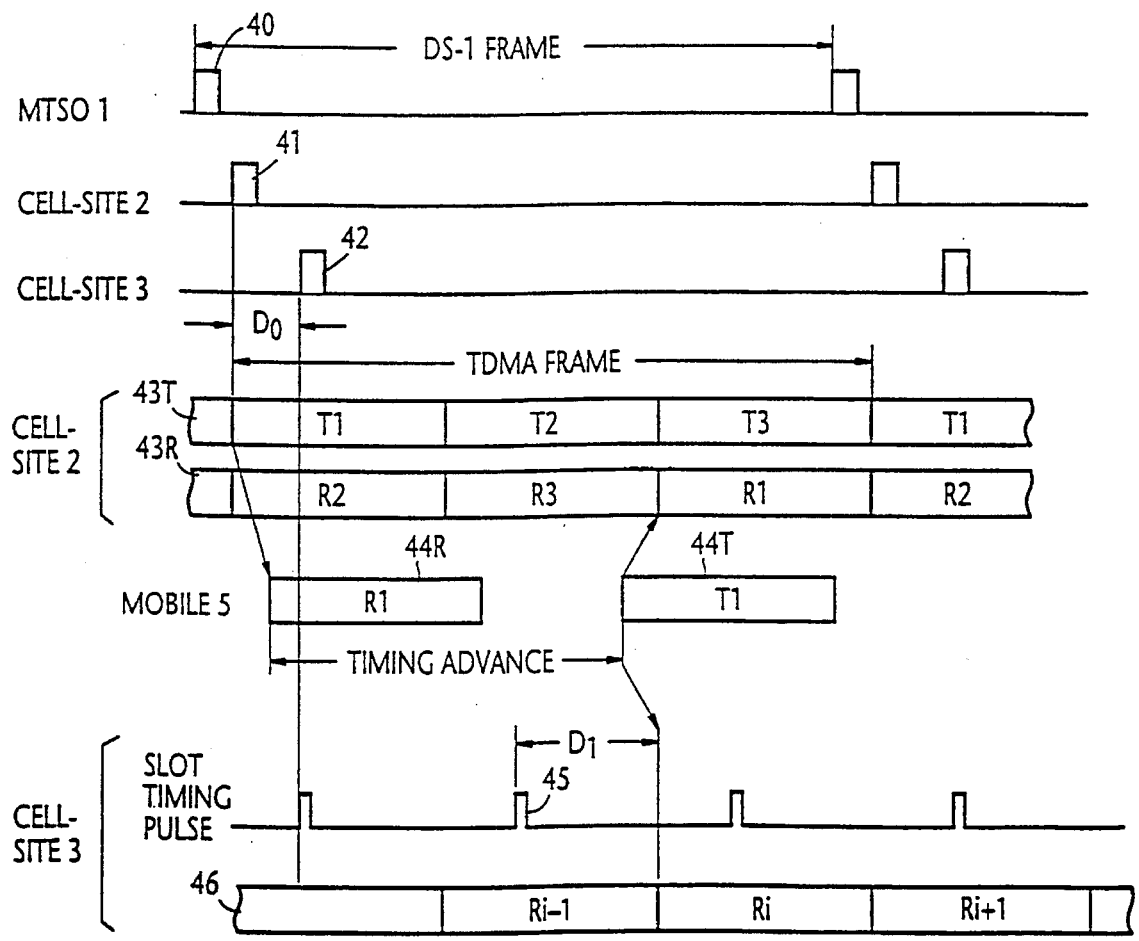
FIG. 4 is a timing diagram useful for describing the operation of the first embodiment of the present invention.

The operation of the cell site stations 2 and 3 will be best understood with the following description given with reference to FIG. 4 by assuming that the mobile unit 5 is in communication with a system user via the cell site 2.

Mobile telephone switching office 1 sends 1.5 Mbps signals synchronized to the same time base to the cell site stations 2 and 3 and a frame sync contained in each of these 1.5 Mbps signals is indicated by numeral 40. At cell sites 2 and 3, the frame sync 40 is received at different times as indicated at 41 and 42, respectively, so that there is a time difference $D_0$ between cell sites 2 and 3 corresponding to the difference between the lengths of their cables 4 to the MTSO 1. At cell site 2, a downlink TDMA frame 43T is transmitted and a downlink burst to the mobile unit 5 is carried on time slot T1 of the frame and received as by mobile unit 5 as indicated at 44R. A timing advance message is multiplexed on time slot T1 of the TDMA frame 43T to cause mobile unit 5 to transmit an uplink burst 44T so that the latter exactly falls into the receive slot R1 of the downlink TDMA frame 43R of cell site 2.

At cell site 3, on the other hand, the controller 18 makes a search through the neighboring cell-site slot memory 41 at intervals when it is free from the call processing tasks of cell site 3, and listens to mobile unit 5 by returning the transceiver 25 according to the slot data in memory 41. As a result, the uplink burst 44T from mobile unit 5 is received a delay time $D_1$ after the most recent slot timing pulse 45 generated by the slot timing generator 20. The delay time $D_1$ is detected 21 and supplied to controller 18. Controller 18 stores the delay time value into delay time memory 42. In this way, several delay time values may be derived from mobile units in different locations and stored in memory 42. Controller 18 seeks an average value of the stored delay times and sets the average delay time value into the variable delay circuit 40. As a result, the slot timing of cell site 3 is delayed by an amount corresponding to the delay time $D_1$ as indicated by numeral 46. Therefore, the slot timing of cell site 3 is aligned with the slot timing of cell site 2. If mobile unit 5 crosses the boundary between cell sites 2 and 3, an uplink burst from mobile unit 5 can be received correctly during a receive slot of cell site 3 and a handoff operation can be smoothly performed.

Figure 5:
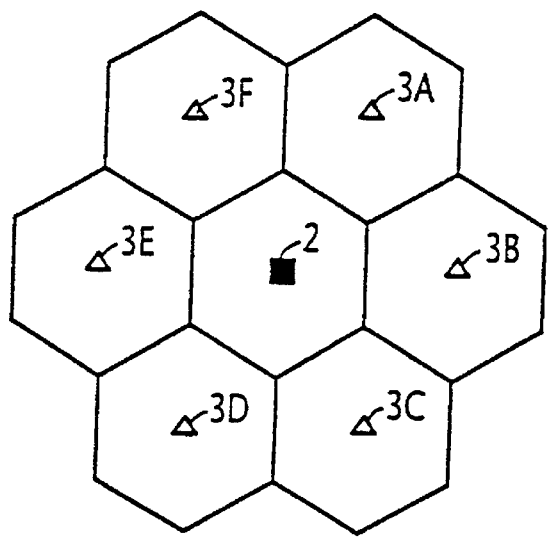
FIG. 5 is an illustration of a typical example of cell patterns in which the first embodiment of the present invention will be used.
Figure 6:
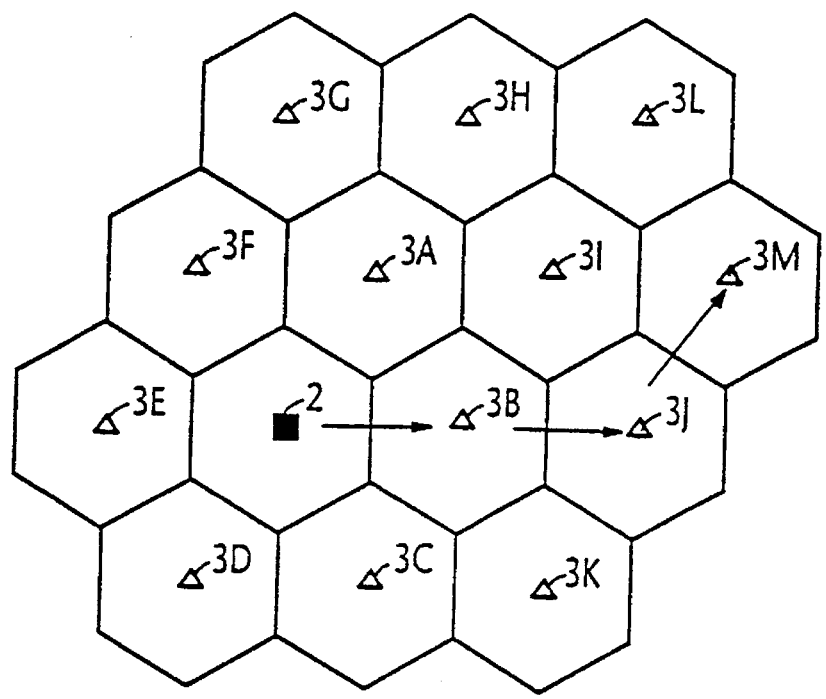
FIG. 6 is an illustration of a typical example of cell patterns in which the second embodiment of the present invention will be used.

FIG. 5 illustrates one example of cell patterns in which the first embodiment of the present invention can be used. The reference cell site station 2 is located at the center of a seven cell cluster configuration surrounded by six subordinate cell site stations 3A to 3F. Since the same pattern can be repeated, the first embodiment of the present invention can be employed in a wider service area. If the number of cell sites in a cluster is more than seven as indicated in FIG. 6 where additional subordinate cell sites 3G to 3M are provided on the outer area of a cluster, such outer cell sites will listen to mobiles located in the inner cells of subordinate stations. Since the inner subordinate cell sites listen to mobile units in the cell of reference station 2, the introduction of delay times to these cell sites must be coordinated.

Figure 7:
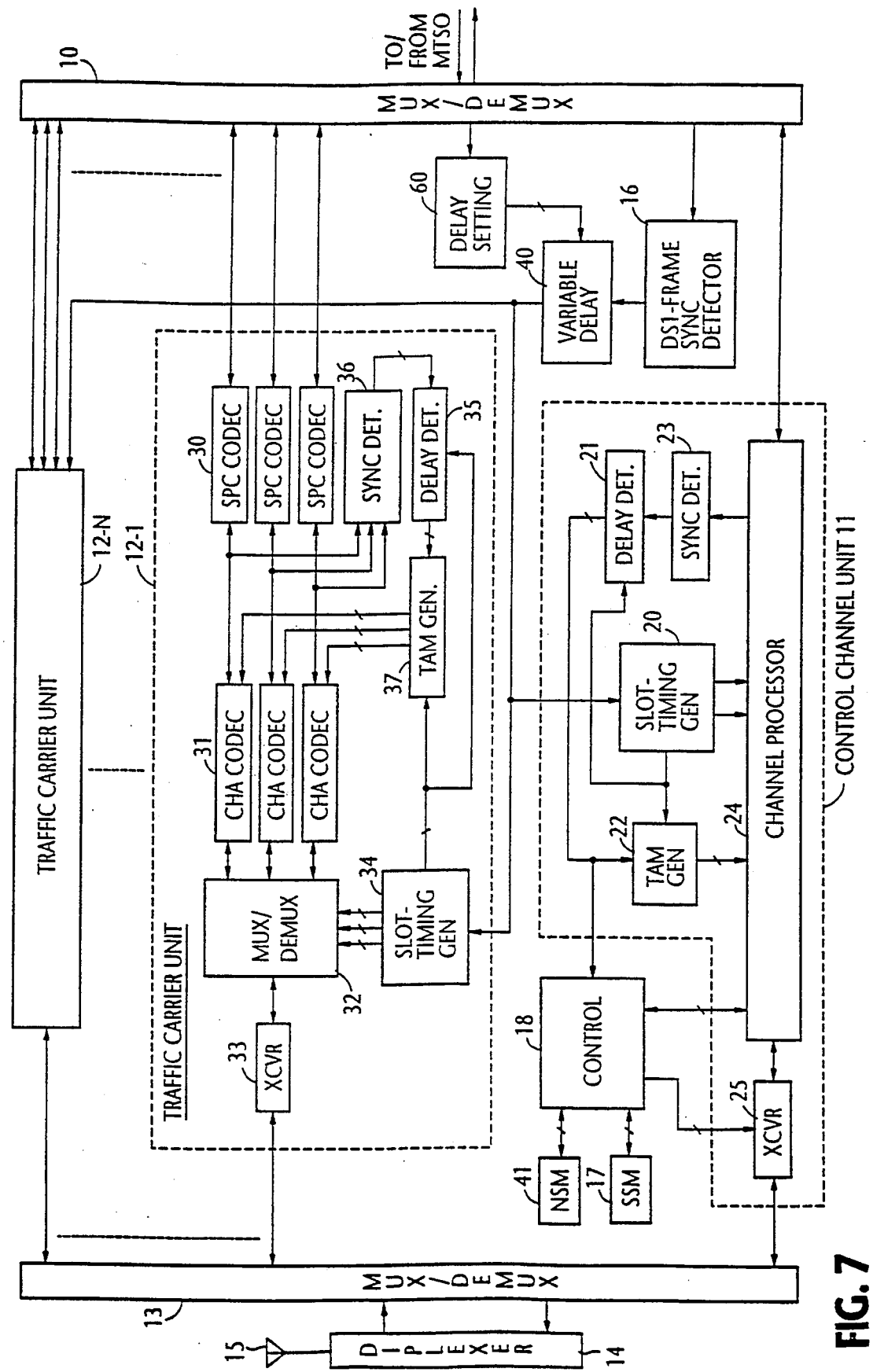
FIG. 7 is a block diagram of each subordinate cell site station according to a second embodiment of the present invention.
Figure 8:
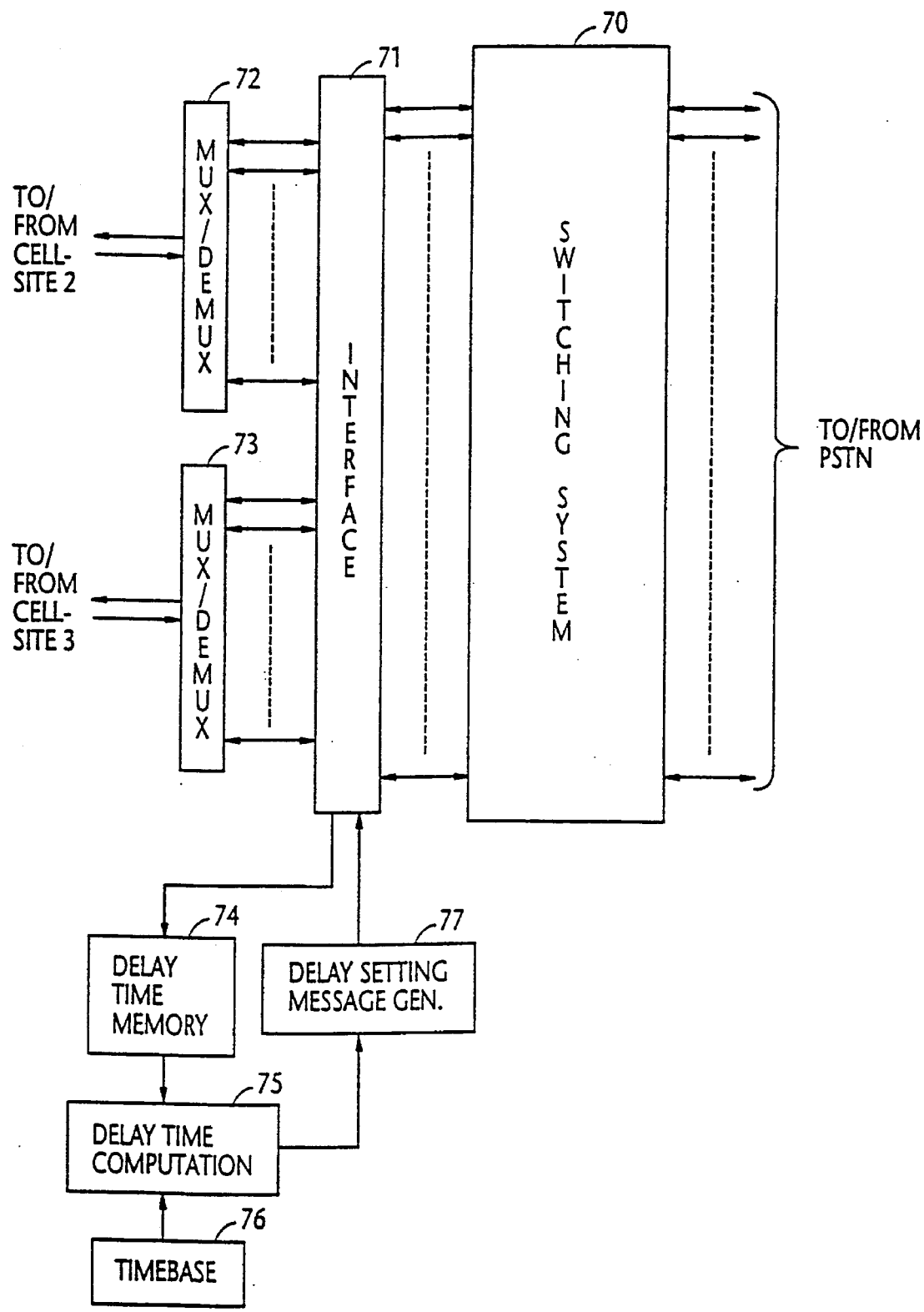
FIG. 8 is a block diagram of the mobile telephone switching office according to the second embodiment of the present invention.

FIG. 7 is a block diagram of each subordinate cell sites according to a second embodiment of the present invention, and FIG. 8 is a block diagram of the MTSO that provides the coordination of the delay times.

The cell site station shown in FIG. 7 differs from the FIG. 3 embodiment in that the delay time memory 42 is dispensed with and a delay setting circuit 60 is provided to respond to a command signal from the MTSO. In addition, the transceiver 25 is retuned during an idle period by controller 18 to listen to a mobile unit in a neighboring cell to allow the delay time detector 21 to detect a delay time of the mobile's signal with respect to the most recent slot timing pulse produced by slot-timing generator 20. This delay time of each subordinate cell site is applied to the controller 18 and supplied to the channel processor 24 and transmitted to the MTSO 1 together with the identification of the cell site. The neighboring cell-site slot memory 41 of each subordinate cell site holds the speech channel frequency data of a predetermined neighboring cell site with which it borders. For example, cell site 3B holds the frequency data of reference cell site 2, cell site 3j holds the frequency data of cell site 3B, and cell site 3M stores the frequency data of cell site 3j. The MTSO 1 knows in advance the delay time relationships among all the subordinate cell sites.

As illustrated in FIG. 8, the MTSO 1 includes a digital switching system 70 which establishes connections between the public switched telephone network, not shown, and an interface 71 to which are connected MUX/DEMUX units 72 and 73 for multiplexing the outputs of interface 71 into downlink 1.5-Mbps primary rate signals bound for cell sites 2 and 3 and demultiplexing uplink 1.5-Mbps primary rate signals from the cell sites into 64-kbps signals to be switched through the switching system 70.

A delay time memory 74 is connected to the interface 71 to store the delay time data transmitted from all subordinate cell sites. A delay time computing unit 75 is connected to the memory 74 to read the collected delay time values from the memory 74 in response to a periodic timing pulse from a timebase 76 and compute the necessary delay times to be introduced to the subordinate cell sites. The computed delay time data are supplied to a delay setting message generator 77 where it is assembled with a cell-site identity code and fed to the interface 71.

At each subordinate cell site, the delay time data from the MTSO is received by the delay setting circuit 60 to set into the variable delay circuit 40 to introduce a particular value of delay time into the reference pulse of the cell site from frame sync detector 16.

Computing unit 75 provides modulo-$\tau$ summation of successive delay time values transmitted from a chain of cell sites (where $\tau$ is the duration of a time slot), say, a first chain of cell sites 3B and 3j to compute data for cell site 3j and a second chain of cell sites 3B, 3j and 3M for computing data for cell site 3M. However, no computations are necessary for those cell sites that border the reference cell site 2 since the delay time values received from these cell sites represent the same value of delays to be introduced in these cell sites. These delay time values are only used for determining the delay time values of adjacent cell sites and simply returned to the delay setting circuit 60 of the source cell sites or a command signal may be sent to these cell sites to set the variable delay 40 to the value of delay times transmitted.

For example, the delay time value for cell site 3j is computed by summing the delay time values from cell sites 3B and 3j to produce a sum. If the sum exceeds an integral multiple of time duration $\tau$, the amount of delay that exceeds the integral multiple of $\tau$ is the desired delay time. Likewise, the delay time value for cell site 3M is computed by summing the delay time values from cell sites 3B, 3j and 3M to produce a second sum. If the second sum exceeds an integral multiple of time duration $\tau$, then the amount of delay that exceeds the integral multiple of $\tau$ is the desired delay time.

Figure 9:
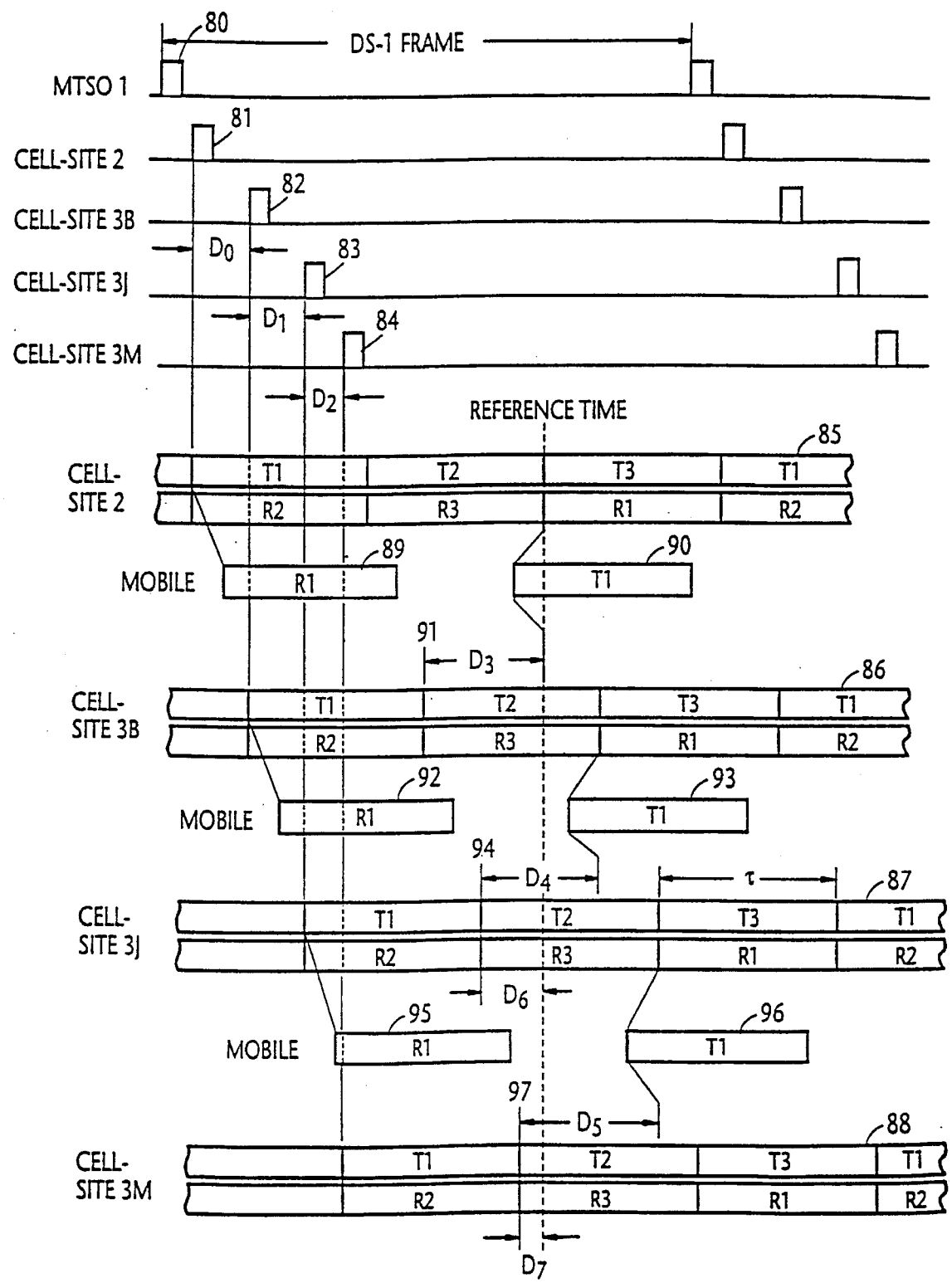
FIG. 9 is a timing diagram useful for describing the operation of the second embodiment of the present invention.

The operation of the second embodiment of the present invention will be better understood with reference to a timing diagram shown in FIG. 9 by assuming that, in response to a frame sync 80 from the MTSO, reference pulses 81, 82, 83 and 84, are produced respectively in succession at cell sites 2, 3B, 3j and 3M with a first time difference $D_0$ between pulses 81 and 82, a second time difference $D_1$ between pulses 82 and 83, and a third time difference $D_2$ between pulses 83 and 84. In response to reference pulses 81, 82, 83 and 84, downlink TDMA frames

85, 86, 87 and 88 are transmitted from cell sites 2, 3B, 3j and 3M, respectively. A mobile user in the cell site 2 area will receive the TDMA frame 85 in a slot 89 and send an uplink burst 90 which will be received by cell site 3B a delay time $D_3$ following the slot timing 91 of TDMA frame 86. In a similar manner, a mobile station in the cell site 3B area will receive the TDMA frame 86 in a slot 92 and send an uplink burst 93 which will be received by cell site 3j a delay time $D_4$ following the slot timing 94 of TDMA frame 87. A mobile station in the cell site 3j area will receive the TDMA frame 87 in a slot 95 and send an uplink burst 96 which will be received by cell site 3M a delay time $D_5$ following the slot timing 97 of TDMA frame 88.

The delay time data $D_3$, $D_4$ and $D_5$ are sent to the MTSO from cell sites 3B, 3j and 3M, respectively, where computations are performed to obtain delay time values $D_6=(D_3+D_4)$ modulo $\tau$ and $D_7=(D_3+D_4+D_5)$ modulo $\tau$. The MTSO sends the delay time values $D_6$ and $D_7$ to cell sites 3j and 3M, respectively, where the variable delay circuit 40 are set to introduce these values to the reference timing pulse. On the other hand, the cell site 3B is commanded to set the delay time $D_3$ into the variable delay circuit 40. In this way, the reference timing pulses of cell sites 2, 3B, 3j and 3M are all synchronized to each other.

What is claimed is:

1. A TDMA (time division multiple access) cellular communication network comprising:

a reference timing source for producing a reference timing signal;

a plurality of cell site stations for receiving a reference timing signal from said reference timing source, each of the cell site stations serving mobile stations located in a respective coverage area, one of said cell site stations being a reference station for establishing a time reference in response to the received reference timing signal, the remaining cell site stations being subordinate stations each comprising:

slot timing means for establishing a time slot in response to the reference timing signal;

monitor means for receiving a signal from a mobile station which is located in the coverage area of said reference station and in communication with said reference station and detecting a time lapse between said time slot and the signal from said mobile station; and variable delay means for introducing a delay time into said time slot according to said time lapse so that the delayed time slot is synchronized to the time reference of said reference station.

2. The TDMA cellular communication network as claimed in claim 1, wherein each of said subordinate stations further comprises:

a memory for storing a plurality of values of said time lapse; and means for deriving an average value of time lapses from the stored plurality of values for causing said variable delay means to introduce the average value of time lapses.

3. The TDMA cellular communication network as claimed in claim 1, wherein said monitor means comprises:

a radio frequency receiver;

a memory for storing data concerning communication channels of said reference station; and means for successively reading stored communication channel data from the memory and tuning said radio frequency receiver according to the read channel data.

4. The TDMA cellular communication network as claimed in claim 1, wherein said reference station is located in a central position of a cluster of said cell site stations bordering on each of said subordinate stations.

5. A TDMA (time division multiple access) cellular communication network comprising:

a mobile switching system;

a plurality of cell site stations connected via respective paths to said mobile switching system for receiving a reference timing signal therefrom, each of the cell site stations serving mobile stations located in a coverage area, one of said cell site stations being a reference station for establishing a time reference in response to the received reference timing signal, the remaining cell site stations being subordinate stations each comprising:

slot timing means for establishing a time slot in response to the reference timing signal;

monitor means for receiving a signal from a mobile station which is located in the coverage area of said reference station and in communication with said reference station and detecting a time lapse between said time slot and the signal from said mobile station;

means for transmitting a signal indicative of the detected time lapse to said mobile switching system; and variable delay means for introducing a delay time into said time slot according to a delay time value received from the mobile switching system so that the delayed time slot is synchronized to the time reference of said reference station, said mobile switching system comprising:

means for receiving the time lapse indicative signal from each of said subordinate stations; and means for deriving said delay time value from the time lapse indicative signals received from a chain of said subordinate stations and transmitting said delay time value to each of said subordinate stations.

6. The TDMA cellular communication network as claimed in claim 5, wherein said delay time value is a modulo $\tau$ summation of the time lapses indicated by the signals received from said chain of subordinate stations, where $\tau$ is the duration of said time slot.

7. The TDMA cellular communication network as claimed in claim 5, wherein said monitor means comprises:

a radio frequency receiver;

a memory for storing data concerning communication channels of said reference station; and means for successively reading stored communication channel data from the memory and tuning said radio frequency receiver according to the read channel data.

8. The TDMA cellular communication network as claimed in claim 1, wherein said reference station comprises means for transmitting a downlink TDMA frame to mobile stations and receiving uplink bursts in respective time slots of an uplink TDMA from the mobile stations and a timing advance message to each of said mobile stations for allowing the mobile station to transmit an uplink burst so that the transmitted uplink burst is received during a time slot of the reference station, and wherein the monitor means of the subordinate station includes means for receiving the uplink burst and deriving said time lapse from the received uplink burst and the reference timing signal received from the mobile switching system.

9. The TDMA cellular communication network as claimed in claim 5, wherein said reference station comprises means for transmitting a downlink TDMA frame to mobile stations and receiving uplink bursts in respective time slots of an uplink TDMA from the mobile stations and a timing advance message to each of said mobile stations for allowing the mobile station to transmit an uplink burst so that the transmitted uplink burst is received during a time slot of the reference station, and wherein the monitor means of the subordinate station includes means for receiving the uplink burst and deriving said time lapse from the received uplink burst and the reference timing signal received from the mobile switching system.

10. A method of synchronizing the time reference of cell site stations in a TDMA (time division multiple access) cellular communication network, each of the cell site stations serving mobile stations located in a respective coverage area and receiving a reference timing signal from a reference timing source, one of said cell site stations being a reference station for establishing a timing reference in response to the received reference timing signal, the remaining cell site stations being subordinate stations, the method comprising the steps of:

at each of said cell site stations, receiving a reference timing signal from a mobile switching system and establishing a time slot therefrom;

at each of said subordinate stations, (a) receiving a signal from a mobile station which is located in the coverage area of said reference station and in communication with said reference station;

(b) detecting a time lapse between said time slot and said signal from the mobile station; and (c) introducing a delay time into said time slot according to said time lapse so that the delayed time slot is synchronized to the time reference of said reference station.

11. A method of synchronizing the time reference of cell site stations in a TDMA (time division multiple access) cellular communication network, each of the cell site stations serving mobile stations located in a coverage area, said cell site stations being connected via respective paths to a mobile switching system for receiving a reference timing signal therefrom and establishing a time slot from the received reference timing signal, one of said cell site stations being a reference station for establishing a timing reference in response to the received reference timing signal, each of the remaining cell site stations being a subordinate station, each of the cell site stations serving mobile stations located in a respective coverage area, one of said cell site stations being a reference station for establishing a time reference in response to the received reference timing signal, the remaining cell site stations being subordinate stations, the method comprising the steps of:

at each of said subordinate stations, receiving a signal from a mobile station which is located in the coverage area of said reference station and in communication with said reference station and detecting a time lapse between said time slot and the signal from said mobile station, and transmitting a signal indicative of the detected time lapse from the subordinate station to said mobile switching system;

at said mobile switching system, receiving the time lapse indicative signal from each of said subordinate stations, and deriving a delay time value from the time lapse indicative signals received from a chain of said subordinate stations and transmitting a signal indicative of said delay time value to each of said subordinate stations; and at each of said subordinate stations, receiving said delay time value indicative signal from the mobile switching system and introducing a delay time into said time slot according to the delay time value of the received signal so that the delayed time slot is synchronized to the time reference of said reference station.

12. The method as claimed in claim 11, wherein said delay time value is a modulo $\tau$ summation of the time lapses indicated by the signals received from said chain of subordinate stations, where $\tau$ is the duration of said time slot.

13. The TDMA cellular communication network as claimed in claim 1, wherein said reference timing source for producing a reference timing signal is a mobile switching system.

14. A TDMA (time division multiple access) cellular communication network comprising:

a reference timing source producing a reference timing signal;

a plurality of cell site stations receiving a reference timing signal from said reference timing source, each of the cell site stations serving mobile stations located in a respective coverage area, one of said cell site stations being a reference station for establishing a time reference in response to the received reference timing signal, the remaining cell site stations being subordinate stations each comprising;

timing generators establishing a time slot in response to the reference timing signal;

detector, channel processor and transceiver receiving a signal from a mobile station which is located in the coverage area of said reference station and in communication with said reference station and detecting a time lapse between said time slot and the signal from said mobile station; and a controller and a variable delay circuit introducing a delay time into said time slot according to said time lapse so that the delayed time slot is synchronized to the time reference of said reference station.

\* \* \* \* \*